United States Patent [19]

Chabot

[11] 4,290,046
[45] Sep. 15, 1981

[54] CODED ELECTRICAL SECURITY SYSTEM FOR VEHICLES, SUCH AS AUTOMOBILES

[76] Inventor: Ovila Chabot, 78, du College St., Pont-Rouge, Prov. of Quebec, Canada, G0A 2X0

[21] Appl. No.: 82,375

[22] Filed: Oct. 5, 1979

Related U.S. Application Data

[63] Continuation-in-part of Ser. No. 4,690, Jan. 19, 1979.

[51] Int. Cl.³ .......................... G08B 1/08; B60R 25/10
[52] U.S. Cl. .......................................... 340/63; 340/74
[58] Field of Search ................... 340/52 R, 63, 64, 65, 340/74

[56] References Cited

U.S. PATENT DOCUMENTS 3,453,591 7/1969 Perez ...................................... 340/64
4,125,833 11/1978 Ravey .................................... 340/63

Primary Examiner—Alvin H. Waring

[57] ABSTRACT

A coded security system for an electrical circuit energizing safety lights installed on a vehicle is disclosed. The system comprises a bank of series connected toggle switches which can be operated in one position following a predetermined code for completing an electrical circuit through the terminals of all the switches, means for connecting one terminal of one of the toggle switches to a source of power, and means for connecting one of the terminals of the last toggle switch in the series to the circuit, whereby operation of the toggle switches following the predetermined code will complete the electrical circuit and energize the circuit.

4 Claims, 4 Drawing Figures

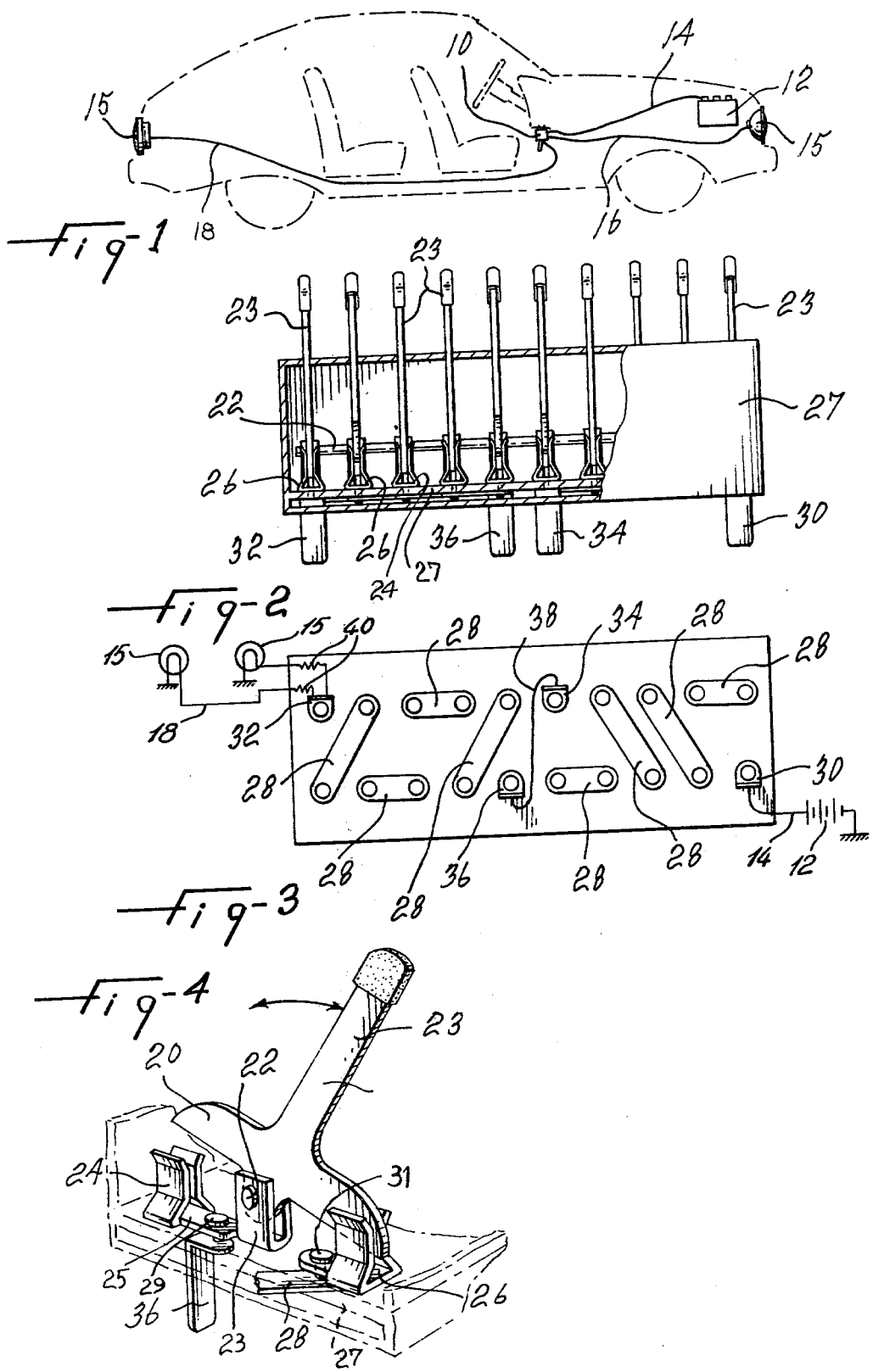

CODED ELECTRICAL SECURITY SYSTEM FOR VEHICLES, SUCH AS AUTOMOBILES

This is a continuation-in-part of the application bearing Ser. No. 004,690 dated Jan. 19, 1979.

This invention relates to a coded system for a utilization circuit, and more particularly, for an automotive electrical circuitry.

BACKGROUND OF THE INVENTION

Various security devices have been designed for preventing unauthorized use of automobiles. The known security devices are generally mechanical in nature such as the locks for blocking the steering columns of automobiles. Some people also install hidden electrical switches in utilization circuits such as the ignition circuit in order to prevent their energization. However, the mechanical locks can be rendered ineffective and the simple electrical switches localized and neutralized.

SUMMARY OF THE INVENTION

It is the object of the present invention to provide a coded security system using plural switches which must be operated properly in order to allow illumination of safety lights installed at the front and tail ends of an automobile.

The coded security system, in accordance with the invention, comprises a bank of series connected double-throw toggle switches, each of which must be operated in one of its two positions following a predetermined code for completing an electrical circuit through the terminals of all the switches, means for connecting one terminal of one of the toggle switches to a power source, specifically a car battery, and means for connecting one of the terminals of the last toggle switch in the series to the circuit for the safety lights, whereby operation of the toggle switches following the predetermined code will complete the electrical circuitry and energize the circuit. Thus, if a car having such safety lights is stolen, the thief, not knowing the code, will not be able to energize the safety lights and any car being driven with the safety lights off will be presumed to have been stolen and the police would arrest the driver. If, on the other hand, the safety lights burn out, the true owner of the automobile has registration papers to prove his or her ownership.

An added safety feature is preferably provided with the coded security system in case a thief succeeds in bypassing the coded switches. This added feature consists of a plurality of graded resistances electrically connected between the coded switches and the safety lights. Each of the lights has a lower voltage than that of the vehicle battery. Therefore, if the coded switches and hence the resistances for each light are electrically bypassed, the battery voltage will burn out the safety lights.

In a predetermined embodiment of the invention, the bank of toggle switches comprises a plurality of double-throw blade switches pivotally mounted on a common non-conductive pin for bridging their respective terminals in one predetermined position and a plurality of electrical connections between one terminal of each switch to one terminal of an adjacent switch for completing the electrical circuit.

BRIEF DESCRIPTION OF THE DRAWINGS

The invention will now be disclosed, by way of example, with reference to the accompanying drawings in which:

FIG. 1 illustrates a side view of an automobile equipped with the security system in accordance with the invention;

FIG. 2 illustrates a side view of the bank of switches used in the security system and two safety lights with their respective resistances in accordance with the invention;

FIG. 3 illustrates a bottom view of the bank of switches of FIG. 2; and

FIG. 4 illustrates a perspective view of the bank of switches of FIG. 2 with the cover removed.

DETAILED DESCRIPTION OF A PREFERRED EMBODIMENT

Referring to the drawings, there is shown a bank of electrical switches 10 mounted underneath the dash of an automobile and connected to the battery 12 through a wire 14 and also to front and back safety lights 15 on the car through wires 16 and 18.

The bank of switches comprises a plurality of blades 20 centrally hinged on a non-conductive shaft 22 and each operated by an integral arm 23 to bridge one or the other of its terminals 24 and 26 when pivoted to one of two oppositely inclined positions. Shaft 22 is supported at each switch by a U-shaped conducting member 23 which straddles and makes electrical contact with blade 20. Member 23 is mechanically and electrically connected to terminal 24 by part 25. Therefore, terminal 24 is a phantom terminal and has the same feel as true terminal 26 since it has the same configuration. Terminal 26 and part 25 are secured to a non-conductive base plate 27 by rivets 29 and 31 respectively. The positions of terminals 24, 26 are arranged at random in the bank of switches and cannot be ascertained unless known by the user. The bank of switches is sealed by an opaque cover 27a such that the switches cannot be seen. The individual switches are interconnected underneath the base of the bank of switches by conducting members 28 so as to form a continuous electrical circuit when the toggle arms are operated in accordance with the proper code. Terminal 30 is connected to the battery 12 of the car through wire 14 and terminal 32 to the parallel connected safety lights 15 with the two central terminals 34 and 36 electrically interconnected through a wire 38.

The added safety feature consists of a resistance 40 series connected with each safety light. Two such resistances 40 and their respective safety lights are shown in FIG. 2. By way of example, one light could have a potential of two volts, another four volts and another eight volts. Appropriate graded resistances 40 are provided for the safety lights to prevent their burning out when the circuit is energized. It will be obvious that if the resistances are bypassed, the safety lights will burn out since they are all less than the voltage of the battery to which the circuit is connected by terminal 30. The resistors 40 could be located inside opaque cover 27.

The above security system operates safety lights 15 on the car in case the vehicle is being operated by an unauthorized person. The terminal 32 could be connected to a relay (not shown) which would be energized to switch power off wires 16 and 18 when the proper code is chosen on the toggle arms but would leave power on the lights when the car is driven by an unauthorized person. Such a relay would simply have normally closed contacts in series with the lights 15 which would be open when the relay is energized. Of course, the lights 15 would have to be connected to a power supply which is off when the engine is not running so as to prevent running down of the battery.

Although the invention has been disclosed with reference to a preferred embodiment, it is to be understood that the invention is not limited to such embodiment but that other alternatives are also envisaged. For example, other types of toggle switches could be used.

What I claim is:

1. A coded electrical security system for a vehicle, such as an automobile, comprising:
   (a) a bank of series-connected double-throw toggle switches, each having a through terminal and a phantom terminal and which must be operated in one of two positions following a predetermined code for completing an electrical circuit through the through terminals of all the switches;
   (b) means for connecting one terminal of one of the toggle switches to an automobile battery;
   (c) at least one safety light mounted externally of said vehicle;
   (d) means for connecting one of the terminals of the last toggle switch in the series to said safety light, whereby operation of the toggle switches following the predetermined code will complete the electrical circuit and energize the safety light; and
   (e) wherein each safety light is of a lesser voltage than the battery and has an appropriate resistance series connected therewith, whereby if the resistance is bypassed, said safety light will burn out.

2. A coded security system as defined in claim 1, wherein said bank of toggle switches comprises a plurality of blade switches pivotally mounted on a common non-conductive pin for bridging their respective electrical terminals in one predetermined position and a plurality of electrical connections between one terminal of each switch to one terminal of an adjacent switch for completing the electrical circuit.

3. A coded security system as defined in claim 2, wherein there are a plurality of parallel connected safety lights, at least one at the front end of a vehicle and at least one at the tail end of said vehicle.

4. A coded security system as defined in claim 1, 2 or 3, wherein said safety lights have different voltages and the corresponding resistances have a different resistance value.

* * * * *